Oct. 23, 1934.        L. L. JONES        1,978,089
ELECTRICALLY HEATED UTENSIL
Filed May 22, 1933
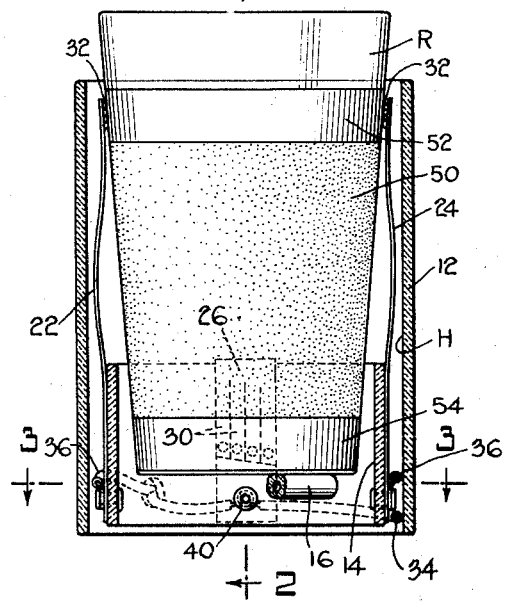
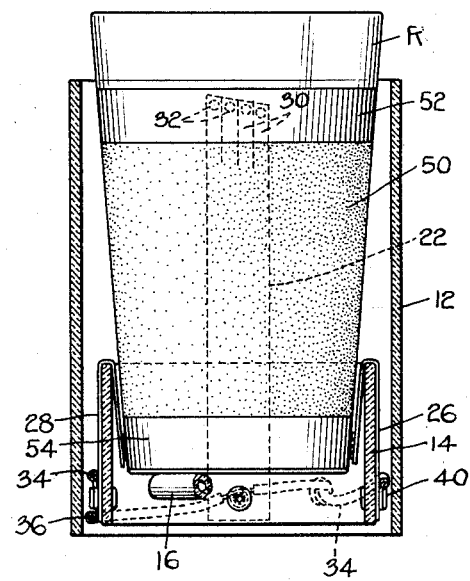
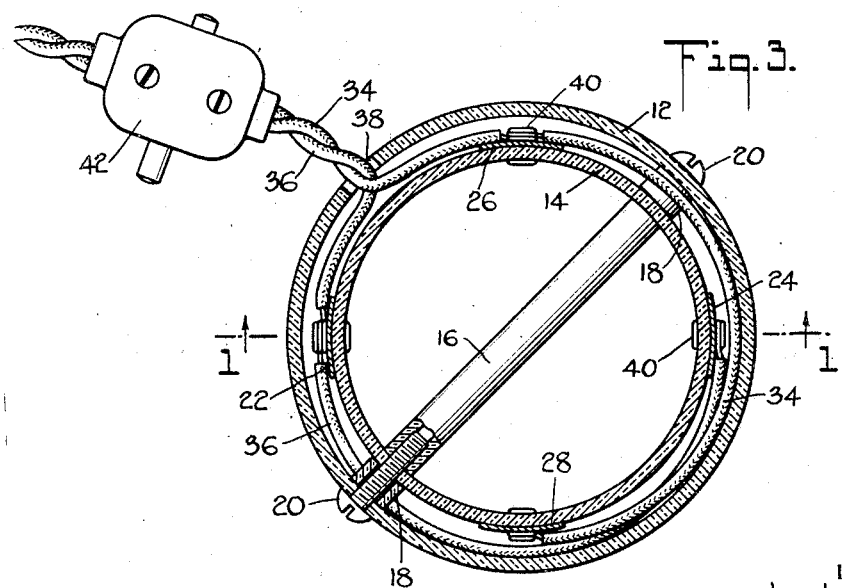
INVENTOR
Lester L. Jones
BY
James & Franklin
ATTORNEYS Patented Oct. 23, 1934

1,978,089

UNITED STATES PATENT OFFICE 1,978,089

ELECTRICALLY HEATED UTENSIL

Lester L. Jones, Oradell, N. J.

Application May 22, 1933, Serial No. 672,178

16 Claims. (Cl. 219—43)

This invention relates to electrically heated utensils, and more particularly to such a utensil adapted for the heating of an individual drink directly in the receptacle in which it is to be served.

The object of the present invention is to generally improve electrically heated utensils, particularly such utensils intended to heat liquid in small quantities, as for an individual drink. A suitable heater for this purpose has long been desired for use by individuals living alone, small families, persons ill or convalescent and requiring frequent warm drinks, and for similar purposes. It has heretofore been necessary to heat the drink in a separate heating pot and to then transfer the same to a glass or cup. This procedure later requires washing of both the glass and the pot, and it is, of course, relatively difficult to wash the metallic surface of a pot in comparison with a glass surface. In an effort to overcome this difficulty, immersion heaters have been made, but these have numerous faults a particular one of which is that when used with milk or drinks other than plain water, the material in the drink becomes baked onto the heater at the exposed edge and full surface thereof, making it difficult to clean, and in any case both the heater and the glass must be cleaned. Fastidious people have an aversion to direct immersion of such a heater in their drink. Electrically heated receptacles and the like are in general metallic and require cleaning of the heater as well as the glass and in no way differ from simple heating of a pot, except that the heat is applied to the pot electrically instead of by a gas flame or the like.

The primary object of the present invention resides in the provision of an electrically heated utensil which will overcome the foregoing faults and disadvantages. Further objects of my invention are to provide such a utensil which will have improved thermal efficiency; which will operate at a relatively low maximum temperature and yet which will produce rapid heating of the liquid; which will be relatively simple, rugged, and fool-proof in construction, economical to manufacture and to use, small in bulk and weight; and, most importantly, which will have all of the convenience of a separate drinking glass, it being readily washable and unencumbered by electric wires and the like, and yet which will possess the advantages of a direct or integral heater in that the heat generated is applied directly and effectively to the liquid in the glass.

To the accomplishment of the foregoing and such other objects as will hereinafter appear, my invention consists in the electrically heated utensil and the elements thereof and their relation one to the other, as hereinafter are more particularly described in the specification and sought to be defined in the claims.

The specification is accompanied by a drawing, in which:

Fig. 1 is a vertical section taken through one form of electrically heated utensil embodying the features of my invention;

Fig. 2 is a vertical section taken in the plane of the line 2—2 of Fig. 1; and

Fig. 3 is a horizontal section taken in the plane of the line 3—3 of Fig. 1.

Referring to the drawing, the invention is embodied by way of exemplification in a utensil adapted to heat liquid in a drinking glass or tumbler which may itself be used for serving the heated drink. The complete utensil comprises a holder H and a receptacle R, the receptacle being readily insertable in or removable from the holder H. The holder is provided with contact elements to which there is connected a flexible cord, while the receptacle R is itself provided with an appropriate heating element, preferably in the form of a film of resistance material coated on the exterior of the receptacle. This resistance film serves to directly and effectively heat the contents of the receptacle when traversed by current supplied through the flexible cord and the contact elements.

Considering the arrangement in greater detail, the holder H comprises a cylinder or sleeve 12 of insulation material such as synthetic resin or the like, having mounted within the lower end thereof a smaller ring 14 of insulation material, the sleeve 12 and ring 14 being held in desired relation by appropriate spaced elements including a rod or tube 16, spacers 18, and screws 20 threaded into the ends of the tube 16. This assembly acts not only to lock the parts in desired relation, but also affords a positive stop limiting the downward movement of the receptacle R when inserting the same, this being evident from an inspection of Figs. 1 and 2.

Secured to the inner ring 14 are a pair of diametrically opposed relatively long spring contact elements 22 and 24, and intermediately disposed relatively short contact elements 26 and 28. The long contact elements may be considered as upper contacts and the short contact elements as lower contacts, these bearing respectively against the upper and lower parts of the glass or receptacle R. It will be noted that the upper contacts 22 and 24 extend upwardly from the outer wall of the insulation ring 14, while the lower contacts 26 and 28 are bent downwardly around the top edge of insulation ring 14. The ends of all of the contact elements are preferably slit to form a plurality of independently yieldable contact fingers 30 each of which is preferably struck inwardly to form a rounded teat or contact surface 32. It will further be noted that the ends of the contact elements are cut on a bias, thereby varying the relative heights of the different fingers and providing a better distributed contact with the receptacle.

The holder H is provided with a flexible cord consisting of conductors 34 and 36 which pass into the holder through an aperture 38 in the lower side wall thereof and which are connected respectively to the lower and upper contacts. Specifically, the wire 34 extends around the base of the holder between the inner and outer members 14 and 12, and is connected first to contact 26 and then to contact 28 by an appropriate rivet or like means 40, and conductor 36 is similarly connected to contact 22 and then contact 24. The flexible cord may be and preferably is provided at a convenient point with a suitable switch 42 for controlling the supply of current to the holder. It will be understood as the description proceeds that it is not essential to employ two upper and two lower contacts, for one upper and one lower contact may equally well be used. The contacts are here used in pairs merely for the sake of symmetry and to equalize the contact pressure applied on the glass or receptacle R.

The receptacle R is in the present case a drinking glass or tumbler of ordinary or standard type modified by having appropriate resistance and contact films applied to the outer surface thereof. Specifically, the outer wall of the glass is coated with a film 50 of resistance material which preferably contacts with and is bordered by upper and lower bands 52 and 54 of highly conductive material. The films applied to the glass are made water-proof so that the glass may be washed in the usual manner without injury thereto. It will be understood from the foregoing description and from inspection of the drawing that the glass is readily elevated out of the holder H or inserted into the same, and that when inserted in the holder the position of the glass is limited by the stop 16, thereby bringing the terminal or conductive bands 52 and 54 into registry with the upper and lower spring contact members, and establishing a circuit for the flow of electrical energy through the resistance film. The heat generated by the resistance film is applied directly to the glass and the contents therein, and is distributed over nearly the entire surface of the glass, thus resulting in efficient and rapid heating without necessitating high temperature operation. When the drink has been warmed as desired, the glass is readily removed from the holder and served. If the drink is not to be boiled but merely warmed, it may be tasted without removing the glass from the holder until ready. The current may then be shut off by means of the switch 42 and the glass lifted from the holder.

The coating of resistance material 50 may vary greatly but is preferably made by painting or coating the glass with a resistance paint consisting of colloidal graphite in a vehicle of a metallic phosphate in a slight excess of phosphoric acid. The metallic phosphate may be aluminum phosphate but most preferably is nickel phosphate. The resistance film is permitted to air-dry and is then baked to a temperature of, say, 550° C. The resulting film is compact, hard-surfaced, and non-hygroscopic. It may be washed in water or with soap and water without injury, but preferably shoud not be abraded when washed.

The bands 52 and 54 may be applied in numerous ways and may, for example, be made by the electrolytic deposition of any desired metal on the resistance film, or by applying finely divided silver in an oil binder and thereafter baking the same to a relatively high temperature to fuse the silver and drive off the oil, but a far more preferable way to form the conductive bands is by the use of finely divided silver (or gold, or other suitable metal) in a binder or vehicle consisting of a metallic phosphate in phosphoric acid. An excellent vehicle is the nickel phosphate vehicle also preferably employed for the resistance paint. This silver paint is permitted to air-dry and is baked at a moderate temperature of, say, 400° C. In practice the conductive and resistive films are brought into overlapping relation to insure excellent contact therebetween, and this may be done either by making the silver bands of extra width and painting the resistance film over the inner portions thereof, or, more preferably, by making the resistance film of excess height and painting the bands of silver wholly or partially on top of the resistance material. In either case a single baking operation may be used for both the resistance and terminal films, and I find that a baking temperature of, say, 475° C. is satisfactory. To summarize, the preferred procedure is to paint the resistance film, permitting the same to air-dry, to then paint the metallic film, permitting the same to air-dry, and finally to bake the complete receptacle.

The use of the nickel phosphate vehicle for both paints is desirable as it promotes adherence of the superposed films, in addition to being an excellent binding vehicle for either film. Further information about resistance films and metallic films of the general character here described may be obtained by reference to U. S. patents to Jones et al., No. 1,773,105, Flanzer et al., No. 1,881,445, and Flanzer No. 1,881,446.

It will be appreciated that in designing my new utensil, the resistance value of the film employed on the glass depends upon the rapidity of heating of the liquid desired or/and the maximum operating temperature desired, as well as the circumference of the film in relation to the length of the film, and that for specified conditions the resistance may be varied by varying the composition or fluidity of the resistance paint applied to the receptacle, or the number of coats applied.

It will be understood that while I have disclosed the receptacle in the form of a drinking glass or tumbler, it may equally well be a ceramic dish or cup and also a test tube, a baby's bottle, or an egg cooker, etc. It will also be understood that the receptacle need not be made wholly of insulating material, it being sufficient if the outer surface thereof is made of insulation, and, specifically, it is possible to use a receptacle made of enameled iron ware, that is, sheet metal coated with vitreous enamel. The paints heretofore discussed react with and have a very satisfactory binding action upon vitreous enamel.

It is believed that the mode of constructing and using the electrically heated utensil of my invention as well as the many advantages thereof, will be apparent from the foregoing detailed description. The thermal efficiency of the unit is high because the mass of the receptacle and the mass of the holder are reduced to a minimum, and, further, because the maximum heating temperature is relatively low so that there is little radiation loss of heat. This reduction in maximum heating temperature is made possible because of the large area of the resistance surface and because of the direct application of the generated heat to the liquid being heated. The liquid is rapidly heated for reasons already outlined, namely, the small mass of the utensil and the large and intimate heating area, and for the additional reason that there is little or no tendency to crack the glass, this being so because of the uniform distribution of even-temperatured heat entirely around the body of the glass. The relatively low maximum temperature employed is desirable because it permits the glass to be handled when removed from the holder unless heated for undue time. It further avoids the necessity for heat insulation for the holder, besides improving the efficiency and economy of operation and avoiding a deleterious heating effect on the lead wires. The unit provides all of the convenience of a separate drinking glass into which an already heated drink has been poured, because the glass is washable like an ordinary glass and may be served and used without encumbering attached wires of any kind. At the same time the unit further possesses the advantages of an integral heater, for despite the fact that the glass is unencumbered by wiring and is used like an ordinary glass, it nevertheless provides for direct and full-area heating of the glass and its contents. The apparatus is simple in structure, light in weight, and may be manufactured and sold at a low cost.

The resistance film preferably terminates an appreciable distance below the top edge of the glass, as shown in the drawing, so that when drinking from the glass the lips will contact only with transparent glass. The arrangement shown may, of course, be modified by reducing the height of the resistance film to leave a substantial area of transparent glass, the resistance film then occupying only, say, the bottom one-third or one-half of the glass. In such case it is desirable to use a reasonably thin high-grade glass so as to prevent cracking due to unequal expansion, particularly if rapid heating is desired. In other words, a higher grade and more expensive modification of the utensil shown is one in which the receptacle is of thin good-quality glass the bottom portion only of which is coated, this glass being received in a holder appropriately reduced in height so as to expose the upper portion of transparent glass with its contents to view.

I may further point out that such partial coating with resistance material is perfectly satisfactory even upon a relatively thick and poor-quality glass, provided that rapid heating is not required. Such a modification is valuable when a drink is to be merely warmed and not boiled. It is especially valuable in connection with babies' bottles, for a relatively small area at the lower end of such a bottle may be coated with the resistance film and the bottle warmed by placing the same in a mating holder preparatory to feeding the baby. The contents of the bottle are readily observed in use because the bottle is inverted or at least laid on its side, bringing the milk into the uncoated upper end of the bottle.

An important general advantage of my invention results from the heat being applied to a substantial area of side wall, instead of only the bottom wall, as in a pot, because with a drink containing solid matter, as cocoa, soup, etc., the solid matter tends to settle to the bottom. Frequent stirring is essential with a bottom-heated pot, to prevent burning of the solid matter. With my arrangement this solid matter is not in contact with a heated wall, and no burning occurs. Furthermore, there is better circulation and hence less settling, for the outside film of liquid readily rises and displaces the inner cooler liquid.

It will be apparent that while I have shown and described my invention in preferred form, many changes and modifications may be made in the structure disclosed without departing from the spirit of the invention, defined in the following claims.

I claim:

1. An electrically heated utensil comprising a holder and a simple single-walled receptacle the outer surface of which is made of electricity insulating material, said holder being provided with contact elements and electric current supply conductors connected thereto, the receptacle being coated on its outer wall with a thin film of carbonaceous resistance material for directly heating the same when traversed by current supplied thereto through the aforesaid contact means on the holder.

2. An electrically heated utensil comprising a holder and a simple single-walled receptacle the outer surface of which is made of electricity insulating material, said holder being provided with yieldable contact elements and conductors connected thereto, the receptacle being readily separable from said holder and being coated on its outer wall with a thin film of resistance material for directly heating the same when traversed by current supplied thereto from the aforesaid contact means on the holder.

3. An electrically heated utensil comprising a holder and a simple single-walled receptacle the outer surface of which is made of electricity insulating material, said holder being provided with contact elements and conductors connected thereto, the receptacle being coated around its outer wall with a thin film of carbonaceous resistance material and having spaced highly conductive metallic bands contacting with opposite ends of the resistance film, the aforesaid contact elements bearing against said bands.

4. An electrically heated utensil comprising a holder and a simple single-walled receptacle the outer surface of which is made of electricity insulating material, said holder being provided with contact elements, said receptacle being readily separable from said holder and being coated around its outer wall with a thin film of resistance material and having spaced highly conductive terminals contacting with the resistance film, said terminals registering with the aforesaid contact elements when the receptacle is positioned in the holder.

5. An electrically heated utensil comprising a holder and a receptacle the outer wall of which is made of insulating material, said holder being provided with upper and lower contact elements, said receptacle being readily separable from said holder and being coated around its outer wall with a thin film of resistance material held thereon by a cohesive binder, a highly conductive metallic area on said receptacle contacting with the resistance film near the upper edge thereof, and a highly conductive metallic area on said receptacle contacting with the resistance film near the lower edge thereof, said conductive areas registering with the aforesaid upper and lower contact elements when the receptacle is positioned in the holder.

6. An electrically heated utensil comprising a holder and a receptacle the outer wall of which is made of insulating material, said holder being provided with spaced contact elements, said receptacle being readily separable from said holder and being coated around its outer wall with a thin film of graphite in a vehicle of metallic phosphate in phosphoric acid, highly conductive terminals contacting with the resistance film, said terminals registering with the aforesaid contact elements when the receptacle is positioned in the holder.

7. An electrically heated utensil comprising a holder and a glass receptacle, said holder being provided with spaced contact elements, said glass receptacle being readily separable from said holder and being coated on its outer wall with a thin film of graphite in a vehicle of metallic phosphate in phosphoric acid, highly conductive contact areas contacting with the resistance film and registering with the aforesaid contact elements when the glass receptacle is positioned in the holder, said contact areas consisting of metal particles in a binder of metallic phosphate in phosphoric acid.

8. An electrically heated utensil comprising a holder and a glass receptacle, said holder being provided with upper and lower contact elements, said glass receptacle being readily separable from said holder and being coated around its outer wall with a thin film of colloidal graphite in a vehicle of nickel phosphate in phosphoric acid, highly conductive contact areas contacting with the resistance film near the upper and lower edges thereof and registering with the aforesaid upper and lower contact elements when the glass receptacle is positioned in the holder, said contact areas consisting of a film of silver in a binder of nickel phosphate in phosphoric acid.

9. An electrically heated utensil comprising a holder and a glass or tumbler detachably insertable therein, said holder comprising an outer frame, upper and lower contact members secured within said outer frame, and means limiting the insertion of the glass in the holder, said glass being coated on its outer surface with a wide annular band of carbonaceous resistance material, said resistance material contacting with top and bottom terminal areas, said areas registering with the upper and lower contacts of the holder when the glass is inserted in the holder.

10. An electrically heated utensil comprising a holder and a glass or tumbler detachably insertable therein, said holder comprising an outer cylinder of insulation material, upper and lower yieldable contact members secured within said outer cylinder, means limiting the insertion of the glass in the holder, and conductors connected to said upper and lower contacts, said glass being coated on its outer surface with a wide annular band of resistance material consisting of carbon in a binding vehicle of metallic phosphate in phosphoric acid, said resistance material contacting with top and bottom bands of highly conductive material including metallic particles in a binding vehicle of metallic phosphate and phosphoric acid, said bands registering with the upper and lower contacts of the holder when the glass is inserted in the holder.

11. An electrically heated utensil comprising a holder and a glass or tumbler detachably insertable therein, said holder comprising an outer cylinder of insulation material, an inner ring of insulation material secured near the bottom of said cylinder, upper and lower yieldable spring contact members secured between said inner ring and outer cylinder, stop means for definitely limiting the insertion of the glass in the holder, and flexible conductors connected to said upper and lower contacts, said glass or tumbler being coated on its outer surface with a wide annular band of resistance material consisting of colloidal graphite in a binding vehicle of nickel phosphate in phosphoric acid, said resistance material contacting with top and bottom rings or bands of silver in a binding vehicle of nickel phosphate in phosphoric acid, said bands registering with the upper and lower contacts of the holder when the glass is inserted in the holder.

12. As an article of manufacture, a simple single-walled glass receptacle closed at its lower end for holding and warming a liquid, said receptacle having a thin film of resistance material applied to the outer surface thereof, said resistance material consisting of carbon applied to the glass in a binder of metallic phosphate in phosphoric acid.

13. As an article of manufacture, a simple single-walled glass receptacle closed at its lower end for holding and warming a liquid, said receptacle having a thin film of resistance material applied to the outer surface thereof, and highly conductive terminal bands contacting with the resistance material.

14. As an article of manufacture, a glass receptacle having a thin film of resistance material applied to the outer surface thereof, said resistance material consisting of graphite in a binder of metallic phosphate in phosphoric acid, and upper and lower highly conductive bands contacting with and bordering the resistance material, said bands consisting of metallic particles in a vehicle of metallic phosphate in phosphoric acid.

15. As an article of manufacture, a glass receptacle having a thin film of resistance material applied to the outer surface thereof, said resistance material consisting of colloidal graphite in a vehicle of nickel phosphate in phosphoric acid, and upper and lower highly conductive bands contacting with and bordering the resistance material, said bands consisting of silver particles in a vehicle of nickel phosphate in phosphoric acid.

16. As an article of manufacture, an electric heating utensil comprising a simple single-walled receptacle for holding and warming a liquid, at least the outer surface of said receptacle being made of electricity-insulating material, and said surface being coated with a thin water-proof film of resistance material to uniformly and directly heat the side walls of the receptacle over a substantial area, the receptacle being devoid of heating means on its bottom wall.

LESTER L. JONES.